US012574174B2

(12) United States Patent
Namgoong et al.

(10) Patent No.: US 12,574,174 B2
(45) Date of Patent: Mar. 10, 2026

(54) REFERENCE SIGNAL CONFIGURATION TO ACCOUNT FOR A COMPRESSION FACTOR ASSOCIATED WITH TRANSMIT (TX) NONLINEARITY

(71) Applicant: QUALCOMM Incorporated, San Diego, CA (US)

(72) Inventors: June Namgoong, San Diego, CA (US); Krishna Kiran Mukkavilli, San Diego, CA (US); Naga Bhushan, San Diego, CA (US); Tingfang Ji, San Diego, CA (US); Joseph Patrick Burke, San Diego, CA (US); Hwan Joon Kwon, San Diego, CA (US); Saeid Sahraei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 17/445,184

(22) Filed: Aug. 16, 2021

(65) Prior Publication Data

US 2022/0052811 A1 Feb. 17, 2022

Related U.S. Application Data

(60) Provisional application No. 63/066,587, filed on Aug. 17, 2020.

(51) Int. Cl.
*H04L 5/00* (2006.01)
*H04B 17/26* (2015.01)
(Continued)

(52) U.S. Cl.
CPC ........... *H04L 5/0048* (2013.01); *H04B 17/26* (2015.01); *H04B 17/345* (2015.01); *H04W 52/52* (2013.01); *H04W 72/23* (2023.01)

(58) Field of Classification Search
CPC ... H04L 5/0048; H04L 5/0044; H04L 5/0051; H04L 5/0091; H04L 25/03;
(Continued)

(56) References Cited

U.S. PATENT DOCUMENTS 7,808,313 B2 * 10/2010 Markowski ........... H03F 1/3247
330/297
8,982,935 B2 3/2015 Subramanian et al.
(Continued)

FOREIGN PATENT DOCUMENTS

CN 106253861 A 12/2016
CN 107872257 A 4/2018
(Continued)

OTHER PUBLICATIONS

International Search Report and Written Opinion—PCT/US2021/071203—ISA/EPO—Jan. 31, 2022.
(Continued)

*Primary Examiner* — Un C Cho
*Assistant Examiner* — Rasha K Fayed
(74) *Attorney, Agent, or Firm* — QUALCOMM Incorporated

(57) ABSTRACT

This disclosure provides systems, methods, and devices for wireless communication that support a reference signal configuration to account for a compression factor due to transmit nonlinearity. In a first aspect, a transmit device is configured to receive an indicator of a scaling factor from a transmit device including a power amplifier. The scaling factor is based on an input power scaling associated with a linear region operation of the power amplifier, an input power scaling associated with a non-linear region operation of the power amplifier, a compression factor, or a combination thereof. The transmit device is further configured to receive shared channel resource elements (REs) from the
(Continued)

*600* transmit device during a slot, and recover the received shared channel REs based on the scaling factor. Other aspects and features are also claimed and described.

30 Claims, 7 Drawing Sheets

(51) Int. Cl.
  *H04B 17/345* (2015.01)
  *H04W 52/52* (2009.01)
  *H04W 72/23* (2023.01)

(58) Field of Classification Search
  CPC .. H04L 27/2636; H04W 52/52; H04W 72/23; H04W 72/04; H04W 84/04; H04W 16/28; H04W 88/08; H04W 4/06; H04W 26/02; H04B 1/3833; H04B 7/0617; H04B 7/0628; H04B 7/0621; H04B 7/024; H04B 7/0686; H04B 7/0413; H04B 7/15528; H04B 7/0486; H04B 7/0404; H04B 7/0456; H04B 7/06; H04B 7/0626; H04B 7/0632; H04B 7/0639; H04B 7/0658; H04B 17/26; H04B 17/345; H04B 17/21; H03G 3/3042
  See application file for complete search history.

(56) References Cited

U.S. PATENT DOCUMENTS

| | | | | |
|---|---|---|---|---|
| 9,313,018 | B1 | 4/2016 | Tyler et al. | |
| 9,787,335 | B1* | 10/2017 | Jeong | H04B 1/0475 |
| 10,921,456 | B2* | 2/2021 | He | H04B 7/1851 |
| 2003/0054851 | A1* | 3/2003 | Jo | H04B 1/0475 |
| | | | | 455/69 |
| 2006/0156042 | A1* | 7/2006 | Desai | G06F 1/3203 |
| | | | | 713/300 |
| 2007/0129025 | A1* | 6/2007 | Vasa | H03F 3/24 |
| | | | | 455/114.2 |
| 2007/0147541 | A1* | 6/2007 | Saito | H03F 3/24 |
| | | | | 375/297 |
| 2007/0180485 | A1 | 8/2007 | Dua | |
| 2009/0093222 | A1* | 4/2009 | Sarkar | H04B 17/21 |
| | | | | 455/127.2 |
| 2010/0284323 | A1* | 11/2010 | Tang | H04H 40/90 |
| | | | | 455/12.1 |
| 2011/0025414 | A1 | 2/2011 | Wolf et al. | |
| 2011/0075745 | A1 | 3/2011 | Kleider et al. | |
| 2012/0229208 | A1* | 9/2012 | Wimpenny | H03F 3/245 |
| | | | | 330/127 |
| 2013/0285743 | A1* | 10/2013 | Onishi | H03F 1/3247 |
| | | | | 330/149 |

| | | | | |
|---|---|---|---|---|
| 2014/0118066 | A1* | 5/2014 | Lee | H03F 3/24 |
| | | | | 330/149 |
| 2014/0301237 | A1 | 10/2014 | Yi et al. | |
| 2014/0362949 | A1* | 12/2014 | Pratt | H03F 1/3247 |
| | | | | 375/296 |
| 2015/0054579 | A1* | 2/2015 | Omer | H03F 1/3258 |
| | | | | 330/149 |
| 2015/0119059 | A1 | 4/2015 | Miao et al. | |
| 2015/0311926 | A1* | 10/2015 | Eliaz | H04B 1/3833 |
| | | | | 375/297 |
| 2016/0072530 | A1* | 3/2016 | El-Hassan | H04B 1/0475 |
| | | | | 455/114.2 |
| 2017/0303144 | A1 | 10/2017 | Guo et al. | |
| 2017/0353163 | A1* | 12/2017 | Gazneli | H03F 3/195 |
| 2018/0034670 | A1* | 2/2018 | van Houtum | H04L 25/0228 |
| 2019/0036661 | A1* | 1/2019 | Ko | H04L 5/0051 |
| 2019/0109222 | A1* | 4/2019 | Liu | H03F 3/423 |
| 2019/0109746 | A1 | 4/2019 | Hosseini et al. | |
| 2019/0165734 | A1* | 5/2019 | Lee | H04B 7/0417 |
| 2019/0181897 | A1* | 6/2019 | Baek | H04B 1/04 |
| 2019/0288779 | A1* | 9/2019 | Wang | H04B 10/0775 |
| 2019/0306876 | A1* | 10/2019 | Golitschek Edler von Elbwart | H04L 5/0053 |
| 2020/0092153 | A1 | 3/2020 | Sarkas et al. | |
| 2020/0169332 | A1* | 5/2020 | Tervo | H04B 17/12 |
| 2020/0186103 | A1* | 6/2020 | Weber | H03F 1/3258 |
| 2020/0186241 | A1* | 6/2020 | Tani | G01S 19/07 |
| 2020/0236634 | A1 | 7/2020 | Sridharan et al. | |
| 2020/0252256 | A1* | 8/2020 | Castelain | H04L 27/2695 |
| 2020/0301380 | A1* | 9/2020 | Gray | G06F 3/044 |
| 2021/0067215 | A1* | 3/2021 | Song | H04L 5/0051 |
| 2021/0266950 | A1 | 8/2021 | Namgoong et al. | |
| 2021/0297172 | A1* | 9/2021 | Jornod | H04B 17/373 |
| 2021/0321423 | A1* | 10/2021 | Kuchi | H04W 72/51 |
| 2022/0029761 | A1* | 1/2022 | Su | H04L 27/2613 |
| 2022/0060297 | A1* | 2/2022 | Tomeba | H04B 7/0665 |
| 2022/0166483 | A1* | 5/2022 | Bian | H04B 7/0417 |
| 2023/0052896 | A1* | 2/2023 | Xiao | H04B 17/382 |
| 2023/0137215 | A1* | 5/2023 | Xu | H04L 1/1816 |
| | | | | 370/329 |
| 2023/0292355 | A1* | 9/2023 | Peng | H04W 72/02 |
| | | | | 370/329 |

FOREIGN PATENT DOCUMENTS

| | | |
|---|---|---|
| WO | WO-2015013239 | 1/2015 |
| WO | WO-2017043731 A1 | 3/2017 |

OTHER PUBLICATIONS

Partial International Search Report—PCT/US2021/071203—ISA/EPO—Dec. 10, 2021.

* cited by examiner

First DMRS RE 510

First PUSCH RE 512

Second DMRS RE 514

Second PUSCH RE 516

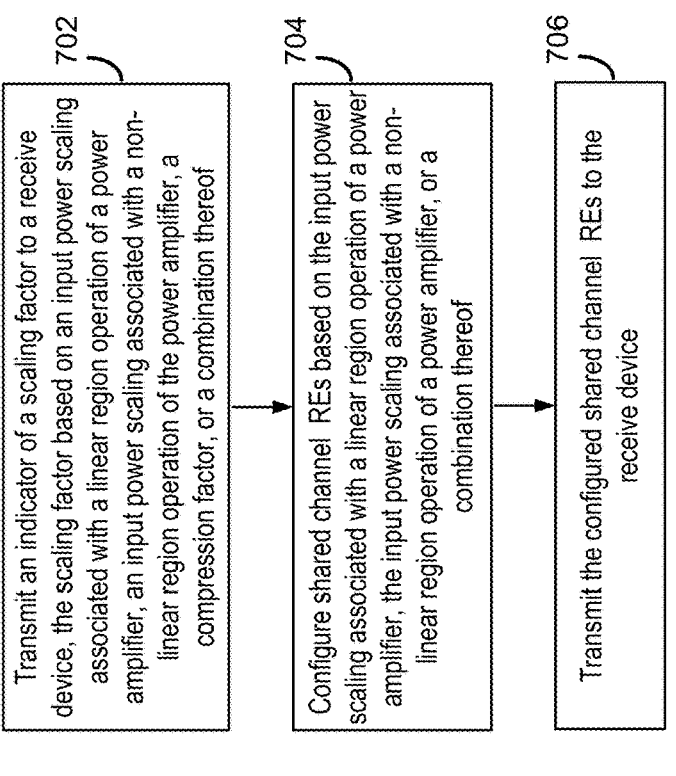

700

702
Transmit an indicator of a scaling factor to a receive device, the scaling factor based on an input power scaling associated with a linear region operation of a power amplifier, an input power scaling associated with a non-linear region operation of the power amplifier, a compression factor, or a combination thereof 704
Configure shared channel REs based on the input power scaling associated with a linear region operation of a power amplifier, the input power scaling associated with a non-linear region operation of a power amplifier, or a combination thereof 706
Transmit the configured shared channel REs to the receive device

602
Receive an indicator of a scaling factor from a transmit device including a power amplifier, the scaling factor based on an input power scaling associated with a linear region operation of the power amplifier, an input power scaling associated with a non-linear region operation of the power amplifier, a compression factor, or a combination thereof 604
Receive shared channel REs from the transmit device during a slot 606
Recover the received shared channel REs based on the scaling factor

*FIG. 6*

REFERENCE SIGNAL CONFIGURATION TO ACCOUNT FOR A COMPRESSION FACTOR ASSOCIATED WITH TRANSMIT (TX) NONLINEARITY

CROSS-REFERENCE TO RELATED APPLICATIONS

This application claims the benefit of U.S. Provisional Patent Application No. 63/066,587, entitled, "REFERENCE SIGNAL CONFIGURATION TO ACCOUNT FOR A COMPRESSION FACTOR ASSOCIATED WITH TRANSMIT (TX) NONLINEARITY," filed on Aug. 17, 2020, (206959P1) the disclosure of which is hereby incorporated by reference herein in its entirety as if fully set forth below and for all applicable purposes.

TECHNICAL FIELD

Aspects of the present disclosure relate generally to wireless communication systems, and more particularly, to a reference signal configuration, such as a reference signal configuration to account for a compression factor associated with transmit nonlinearity. Some disclosed techniques can aid transmitting and receiving devices to configure and recover signals to aid in efficient wireless communications for efficient power amplifier operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

A transmit device may transmit a waveform to a receive device during uplink or downlink communication. When a transmit device transmits a waveform, the waveform may be distorted based on one or more radio frequency (RF) components, such as by a power amplifier, of the transmit device. For example, the waveform may experience distortion associated with a compression factor due to transmit (Tx) nonlinearity when the power amplifier is operated in the non-linear region. A receive device that receives the waveform including the distortion may experience poor performance based on the distortion. For example, the distortion may make the waveform appear noisy at the receive device and result in a poor classification of the modulated waveform by the receive device.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method of wireless communication performed by a receive device. The method includes receiving an indicator of a scaling factor from a transmit device including a power amplifier. The scaling factor can be based on an input power scaling associated with a linear region operation of the power amplifier, an input power scaling associated with a non-linear region operation of the power amplifier, a compression factor, or a combination thereof. The method further includes receiving shared channel resource elements (REs) from the transmit device during a slot, and recovering the received shared channel REs based on the scaling factor.

Another innovative aspect of the subject matter described in this disclosure can be implemented in a receive device. The receive device includes at least one processor and a memory coupled with the at least one processor and storing processor-readable instructions that, when executed by the at least one processor, is configured to receive an indicator of a scaling factor from a transmit device including a power amplifier. The scaling factor can be based on an input power scaling associated with a linear region operation of the power amplifier, an input power scaling associated with a non-linear region operation of the power amplifier, a compression factor, or a combination thereof. The processor-readable instructions are further configured to receive shared channel REs from the transmit device during a slot, and recover the received shared channel REs based on the scaling factor.

Another innovative aspect of the subject matter described in this disclosure can be implemented in an apparatus configured for wireless communication. The apparatus includes means for receiving an indicator of a scaling factor from a transmit device including a power amplifier. The scaling factor can be based on an input power scaling associated with a linear region operation of the power amplifier, an input power scaling associated with a non-linear region operation of the power amplifier, a compression factor, or a combination thereof. The apparatus also includes means for receiving shared channel REs from the transmit device during a slot, and means for recovering the received shared channel REs based on the scaling factor.

Another innovative aspect of the subject matter described in this disclosure can be implemented in a non-transitory computer-readable medium storing instructions that, when executed by a processor, cause the processor to perform operations including receiving an indicator of a scaling factor from a transmit device including a power amplifier. The scaling factor can be based on an input power scaling associated with a linear region operation of the power amplifier, an input power scaling associated with a non-linear region operation of the power amplifier, a compression factor, or a combination thereof. The operations further include receiving shared channel REs from the transmit device during a slot, and recovering the received shared channel REs based on the scaling factor.

Another innovative aspect of the subject matter described in this disclosure can be implemented in an apparatus configured for wireless communication. The apparatus includes an interface configured for wireless communication and a processor system coupled to the interface. The interface is configured to receive an indicator of a scaling factor from a transmit device including a power amplifier. The scaling factor can be based on an input power scaling associated with a linear region operation of the power amplifier, an input power scaling associated with a non-linear region operation of the power amplifier, a compression factor, or a combination thereof. The interface is further configured to receive shared channel REs from the transmit device during a slot. The processor system is configured to recover the received shared channel REs based on the scaling factor.

Another innovative aspect of the subject matter described in this disclosure can be implemented in a method of wireless communication performed by a transmit device. The method includes transmitting an indicator of a scaling factor to a receive device. The scaling factor can be based on an input power scaling associated with a linear region operation of a power amplifier, an input power scaling associated with a non-linear region operation of the power amplifier, a compression factor, or a combination thereof. The method further includes configuring shared channel REs based on the input power scaling associated with a linear region operation of a power amplifier, the input power scaling associated with a non-linear region operation of a power amplifier, or a combination thereof, and transmitting the configured shared channel REs to the receive device.

Another innovative aspect of the subject matter described in this disclosure can be implemented in a transmit device. The transmit device includes at least one processor and a memory coupled with the at least one processor and storing processor-readable instructions that, when executed by the at least one processor, is configured to initiate transmission of an indicator of a scaling factor to a receive device. The scaling factor can be based on an input power scaling associated with a linear region operation of a power amplifier, an input power scaling associated with a non-linear region operation of the power amplifier, a compression factor, or a combination thereof. The processor-readable instructions are further configured to configure shared channel REs based on the input power scaling associated with a linear region operation of a power amplifier, the input power scaling associated with a non-linear region operation of a power amplifier, or a combination thereof, and initiate transmission of the configured shared channel REs to the receive device.

Another innovative aspect of the subject matter described in this disclosure can be implemented in an apparatus configured for wireless communication. The apparatus includes means for transmitting an indicator of a scaling factor to a receive device. The scaling factor can be based on an input power scaling associated with a linear region operation of a power amplifier, an input power scaling associated with a non-linear region operation of the power amplifier, a compression factor, or a combination thereof. The apparatus also includes means for configuring shared channel REs based on the input power scaling associated with a linear region operation of a power amplifier, the input power scaling associated with a non-linear region operation of a power amplifier, or a combination thereof, and means for transmitting the configured shared channel REs to the receive device.

Another innovative aspect of the subject matter described in this disclosure can be implemented in a non-transitory computer-readable medium storing instructions that, when executed by a processor, cause the processor to perform operations including initiating transmission of an indicator of a scaling factor to a receive device. The scaling factor can be based on an input power scaling associated with a linear region operation of a power amplifier, an input power scaling associated with a non-linear region operation of the power amplifier, a compression factor, or a combination thereof. The operations further include configuring shared channel REs based on the input power scaling associated with a linear region operation of a power amplifier, the input power scaling associated with a non-linear region operation of a power amplifier, or a combination thereof, and initiating transmission of the configured shared channel REs to the receive device.

Another innovative aspect of the subject matter described in this disclosure can be implemented in an apparatus configured for wireless communication. The apparatus includes an interface configured for wireless communication and a processor system coupled to the interface. The interface is configured to transmit an indicator of a scaling factor to a receive device. The scaling factor can be based on an input power scaling associated with a linear region operation of a power amplifier, an input power scaling associated with a non-linear region operation of the power amplifier, a compression factor, or a combination thereof. The processor system is configured to configure shared channel REs based on the input power scaling associated with a linear region operation of a power amplifier, the input power scaling associated with a non-linear region operation of a power amplifier, or a combination thereof. The interface is further configured to transmit the configured shared channel REs to the receive device.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a flow diagram illustrating an example process that supports a reference signal configuration to account for a compression factor associated with transmit nonlinearity according to some aspects.

FIG. 7 is a flow diagram illustrating an example process that supports a reference signal configuration to account for a compression factor due to transmit nonlinearity according to some aspects.

Like reference numbers and designations in the various drawings indicate like elements.

DETAILED DESCRIPTION

Figure 1:
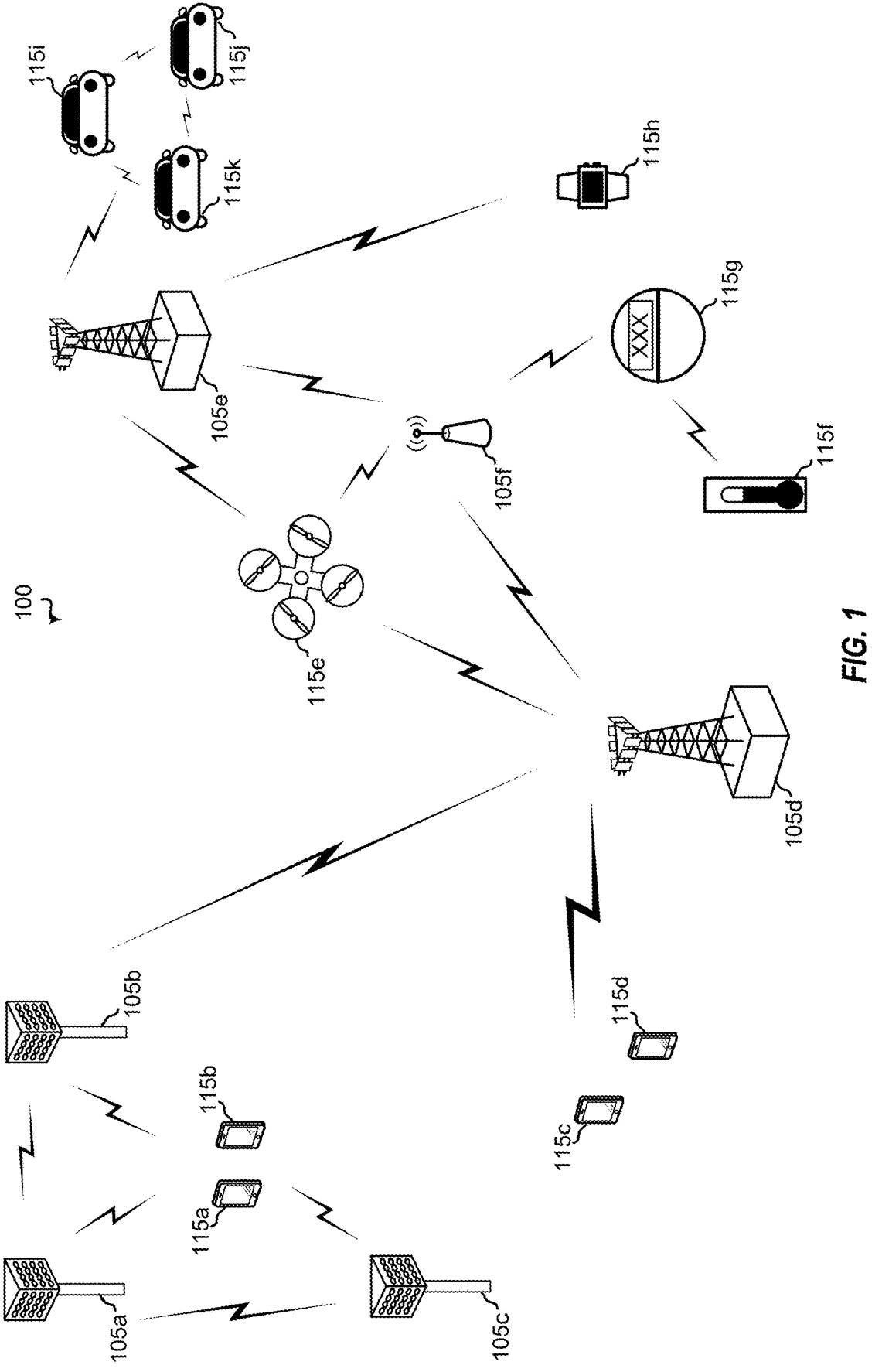
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km², ultra-low complexity (e.g., ~10 s of bits/sec), ultra-low energy (e.g., ~10+years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements, etc. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, disaggregated yet connected, or aggregated devices, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f* Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
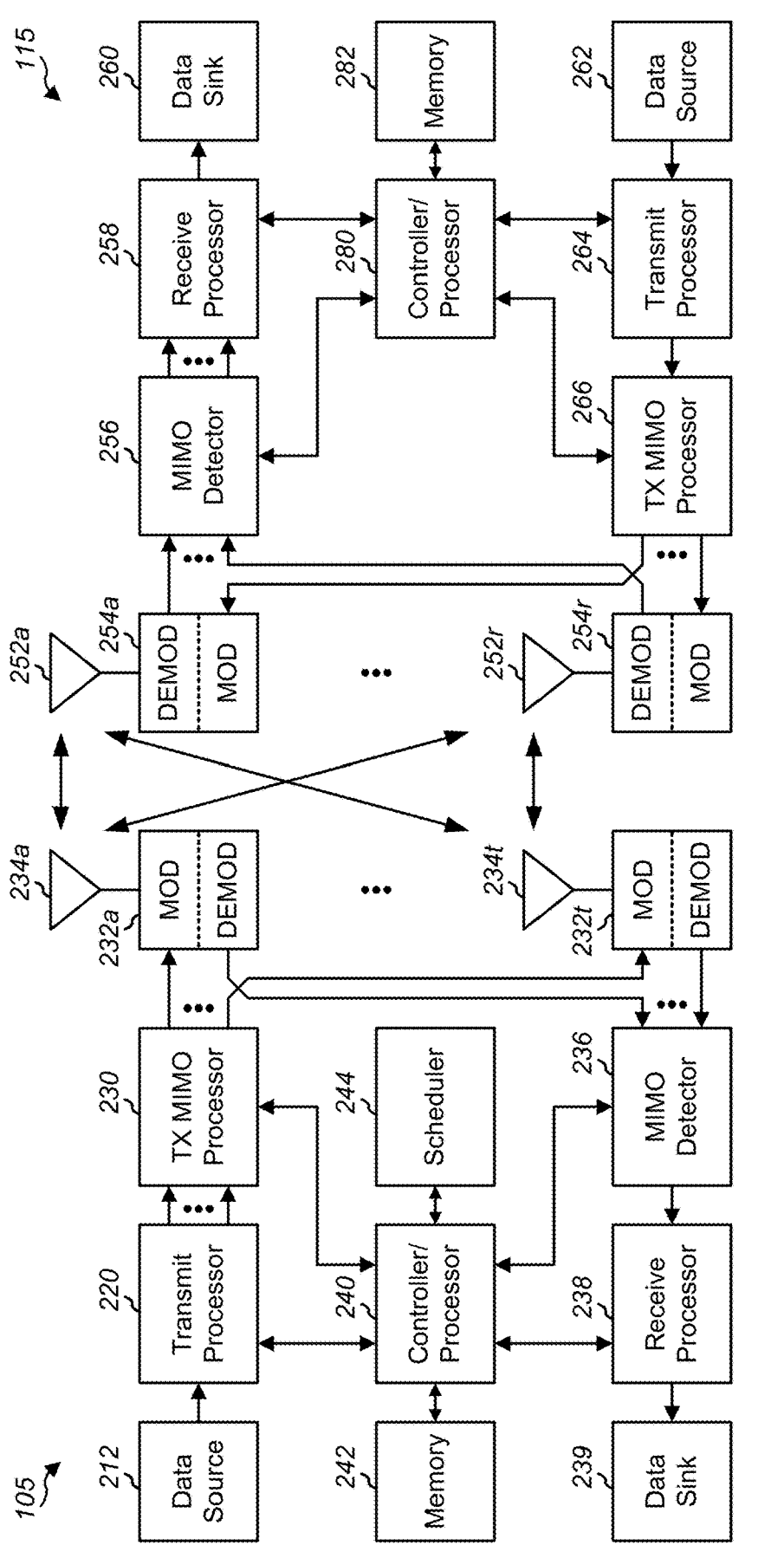
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 6 and 7, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
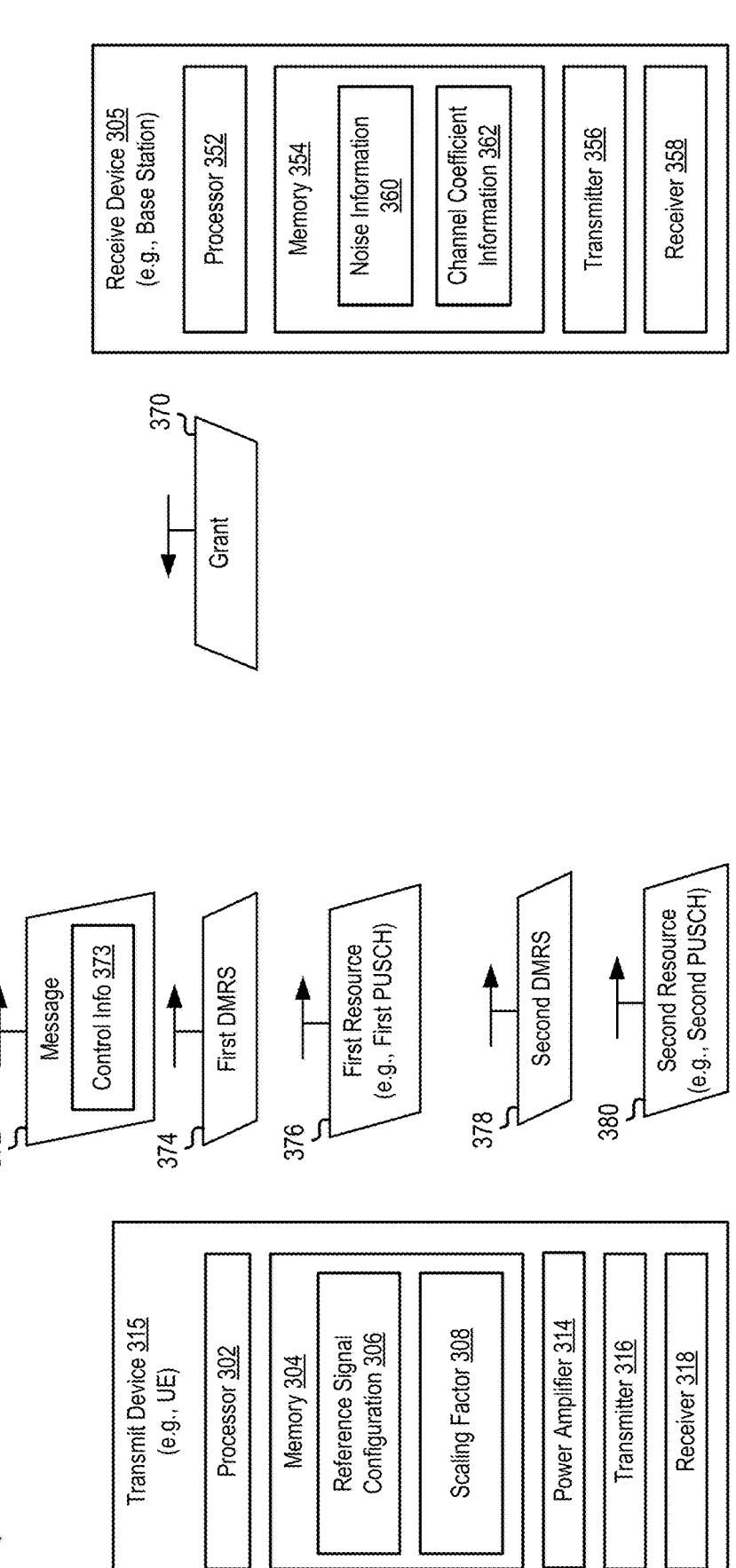
FIG. 3 is a block diagram illustrating an example wireless communication system that supports a reference signal configuration to account for a compression factor due to transmit nonlinearity according to some aspects.

FIG. 3 is a block diagram of an example wireless communications system 300 that supports a reference signal configuration to account for a compression factor due to transmit nonlinearity according to some aspects. In some examples, the wireless communications system 300 may implement aspects of the wireless network 100. The wireless communications system 300 includes a transmit device 315 and a receive device 305. As describe herein with reference to FIG. 3, the transmit device 315 and the receive device 305 are configured for uplink (UL) communication. When configured for UL communication, the receive device 305 includes the base station 105 and the transmit device 315 includes the UE 115. Alternatively, the transmit device 315 and the receive device 305 may be configured for downlink (DL) communication. When configured for DL communication, the receive device 308 includes the UE 115 and the transmit device 315 includes the base station 105.

The transmit device 315 can include a variety of components (such as structural, hardware components) used for carrying out one or more functions described herein. For example, these components can include one or more processors 302 (hereinafter referred to collectively as "the processor 302"), one or more memory devices 304 (hereinafter referred to collectively as "the memory 304"), one or more power amplifiers 314 (hereinafter referred to collectively as "the power amplifier 314"), one or more transmitters 316 (hereinafter referred to collectively as "the transmitter 316"), and one or more receivers 318 (hereinafter referred to collectively as "the receiver 318"). The processor 302 may be configured to execute instructions stored in the memory 304 to perform the operations described herein. In some implementations, the processor 302 includes or corresponds to one or more of the receive processor 258, the transmit processor 264, and the controller 280, and the memory 304 includes or corresponds to the memory 282.

The memory 304 may include one or more reference signal configurations 306 (hereinafter referred to collectively as "the reference signal configuration 306") and one or more scaling factors 308 (hereinafter referred to collectively as "the scaling factor 308").

The reference signal configuration 306 may include one or more reference signal configurations as described herein. For example, a reference signal configuration may be configured to account for a compression factor due to Tx nonlinearity. Additionally, or alternatively, the reference signal configuration 306 may include or correspond to one or more MCSs. The scaling factor 308 may include one or more scaling factors to be used by the receive device to account for compression factor due to Tx nonlinearity.

The power amplifier 314 may be configured to as part of a transmit chain configured to transmit one or more waveforms or signals. The transmitter 316 is configured to transmit reference signals, control information and data to one or more other devices, and the receiver 318 is configured to receive references signals, synchronization signals, control information and data from one or more other devices. For example, the transmitter 316 may transmit signaling, control information and data to, and the receiver 318 may receive signaling, control information and data from, the receive device 305 or the base station 105. In some implementations, the transmitter 316 and the receiver 318 may be integrated in one or more transceivers. Additionally or alternatively, the transmitter 316 or the receiver 318 may include or correspond to one or more components of the UE 115 described with reference to FIG. 2, as an illustrative, non-limiting example.

The receive device 305 can include a variety of components (such as structural, hardware components) used for carrying out one or more functions described herein. For example, these components can include one or more processors 352 (hereinafter referred to collectively as "the processor 352"), one or more memory devices 354 (hereinafter referred to collectively as "the memory 354"), one or more transmitters 356 (hereinafter referred to collectively as "the transmitter 356"), and one or more receivers 358 (hereinafter referred to collectively as "the receiver 358"). The processor 352 may be configured to execute instructions stored in the memory 354 to perform the operations described herein. In some implementations, the processor 352 includes or corresponds to one or more of the receive processor 238, the transmit processor 220, and the controller 240, and the memory 354 includes or corresponds to the memory 242.

The memory 354 may include noise information 360 and channel coefficient information 362. The noise information 360 may include a noise variance, a noise covariance matrix, or a combination thereof. The channel coefficient information 362 may include one or more channel coefficients, such as one or more channel coefficient estimates.

The transmitter 356 is configured to transmit reference signals, synchronization signals, control information and data to one or more other devices, and the receiver 358 is configured to receive reference signals, control information and data from one or more other devices. For example, the transmitter 356 may transmit signaling, control information and data to, and the receiver 358 may receive signaling, control information and data from, the transmit device 315 or to the UE 115. In some implementations, the transmitter 356 and the receiver 358 may be integrated in one or more transceivers. Additionally or alternatively, the transmitter 356 or the receiver 358 may include or correspond to one or more components of base station 105 described with reference to FIG. 2, as an illustrative, non-limiting example.

In some implementations, the wireless communications system 300 implements a 5G New Radio (NR) network. For example, the wireless communications system 300 may include multiple 5G-capable UEs 115 and multiple 5G-capable base stations 105, such as UEs and base stations configured to operate in accordance with a 5G NR network protocol such as that defined by the 3GPP.

The transmit device 315 may be configured to transmit a waveform to the receive device 305. The waveform may be distorted based on one or more radio frequency (RF) components of the transmit device 315, such as by the power amplifier 314. For example, the distortion may be caused at least in part by a compression factor associated with a transmit (Tx) nonlinearity of the power amplifier.

When the waveform transmitted is distorted by the power amplifier 314, the output from the power amplifier 314 may be viewed as a sum of a scaled version of the intact waveform (e.g., the waveform without distortion) and the distortion that is uncorrelated with the intact transmitted waveform. To illustrate, the input to the power amplifier 314 may be denoted as s(t), where t is the time variable. Based on Bussgang's theorem, the output from the power amplifier 314 may be characterized as:

$$\alpha\ (s(t))+d(t),$$

where α is a first scaling factor (also referred to herein as a compression factor), and d(t) is a distortion that is uncorrelated with s(t). In some implementations, the distortion, such as non-linear distortion, may be caused by the power amplifier 314. For example, when the power amplifier 314 is operated in the non-linear region of the power amplifier 314, waveform may experience sizable distortion. In order for the receive device 305 to demodulate the received signal that is distorted by the power amplifier 314, the receive device 305 may need to account for the first scaling factor α, as described further herein.

Figure 4:
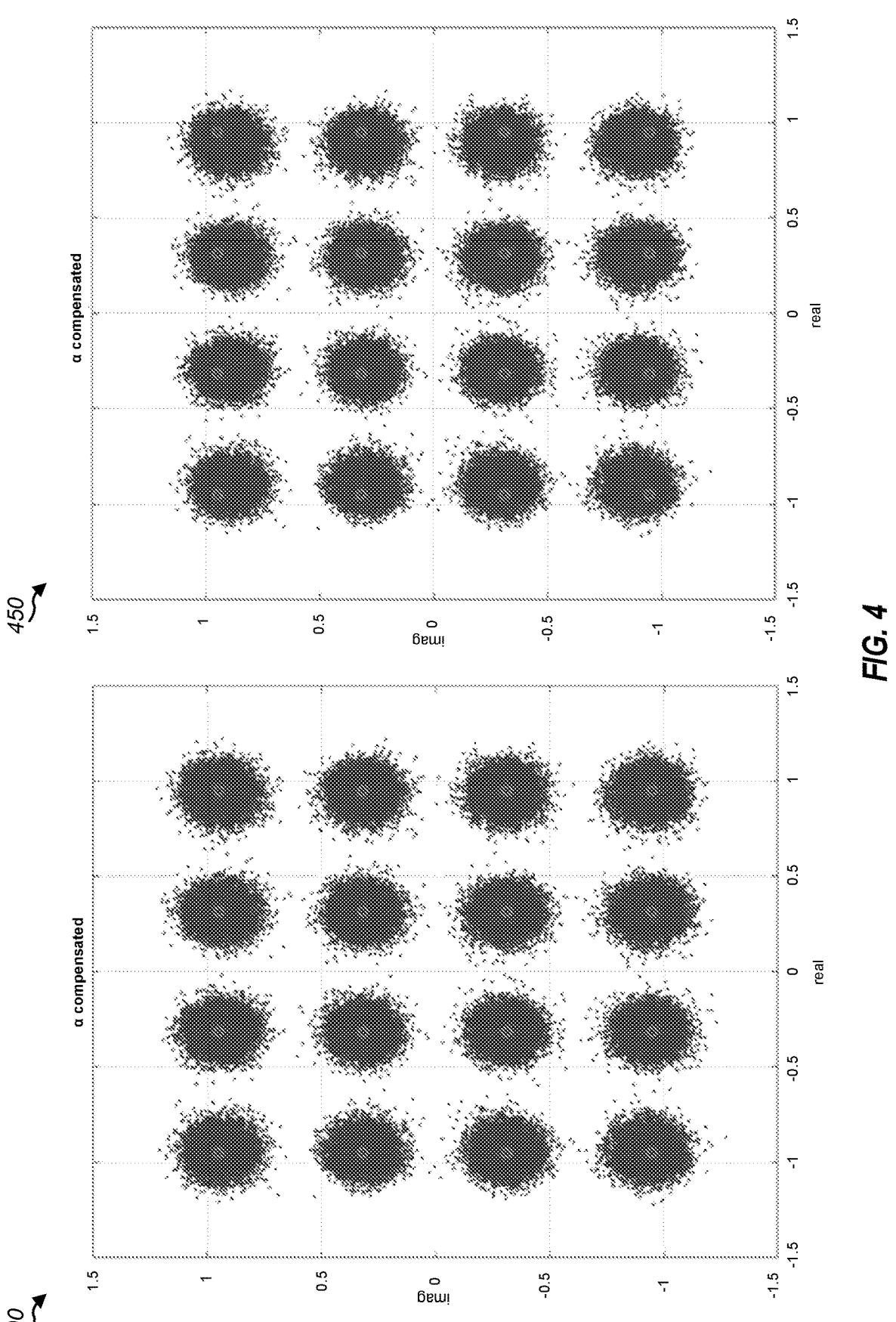
FIG. 4 is a diagram of examples of received constellations to illustrate a reference signal configuration to account for a compression factor due to transmit nonlinearity according to some aspects.

Referring to FIG. 4, a diagram of examples of received constellations to illustrate a reference signal configuration to account for a compression factor due to transmit nonlinearity according to some aspects is shown. For example, FIG. 4 includes a first graph 400 in which the first scaling factor α is compensated and a second graph 450 in which the first scaling factor α is not compensated. Each of the first graph 400 and the second graph 450 illustrates 16QAM signal is transmitted on OFDM subcarriers. To illustrate, each of the first graph 400 and the second graph 450 shows sixteen clusters. Each cluster may be associated with a first set of points, such as points 402, corresponding to a waveform that was transmitted—i.e., s(t).

As shown in in the second graph 450, the points 402 are not positioned at a center of each cluster which leads to suboptimal modulation performance by the receive device 305. However, as shown in the first graph 400 in which the first scaling factor α is compensated for and the cluster is shifted such that the points 402 are positioned at a center of each cluster—e.g., the centers are aligned with the ideal constellation points. Shifting each cluster results in a classification of the modulated signal being better on average as compared to the second graph 150.

Figure 5:
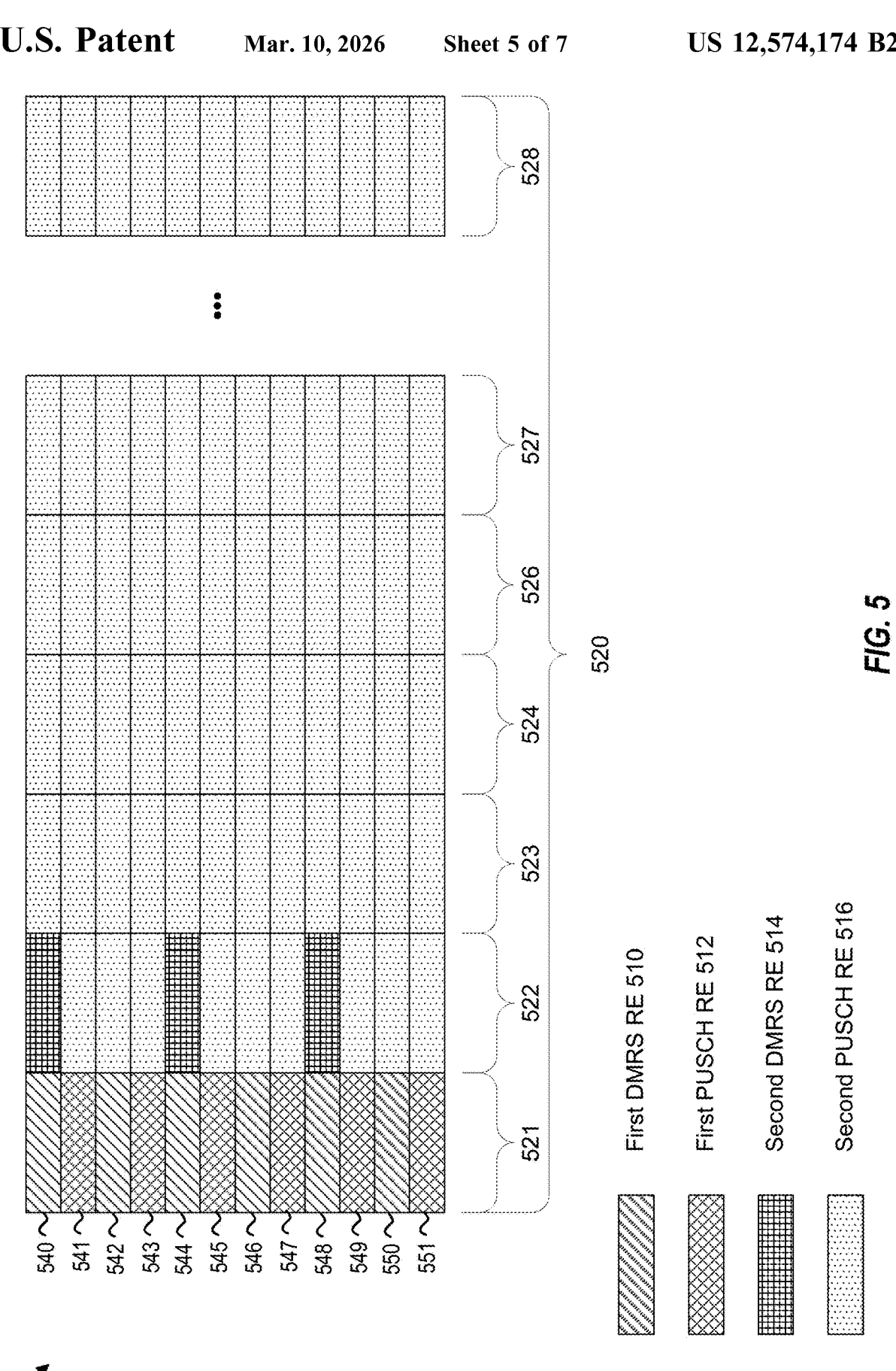
FIG. 5 is a diagram of an example of an uplink slot format according to some aspects.

Referring to FIG. 5, a diagram of an example of a slot format 500 according to some aspects is shown. The slot format 500 may aid the receive device 305 to account for the first compression factor in the demodulation processing. The slot format 500, such as an uplink slot format, may include or correspond to the reference signal configuration 306, the scaling factor 308, or a combination thereof. Although FIG. 5 is presented and described with reference to an uplink signal to aid the receive device 305 to account for the scaling factor in demodulation processing, the description of FIG. 5 may also be applicable for a downlink signal.

The slot format 500 includes a slot 520. The slot 520 includes multiple symbols 521-528 in the time domain, such as multiple OFDM symbols. Although the slot 520 is shown as having 7 symbols, the slot may include n symbols, where n is a positive integer greater than 1. In some implementations, as described herein, n is equal to 14. The slot format 500 also includes multiple subcarriers 540-551.

The slot format 500 may define a position of a first set of DMRS REs 510, a first set of PUSCH REs 512, a second set of DMRS REs 514, and a second set of PUSCH REs 516. For downlink communication, the first set of PUSCH REs 512 and the second set of PUSCH REs 516 may be a first set of PDSCH REs and a second set of PDSCH REs, respectively. The first DMRS REs 510 and the second DMRS REs 514 may be used for a channel estimation in 5G waveforms. The DMRS REs are associated with a carrier and are transmitter on the first OFDM symbol and are used to estimate the propagation channel, such as a multi-path channel.

According to a reference signal configuration associated with the slot format 500, the power amplifier 314 may be operated in a linear region for the transmission of a first OFDM symbol 521. To operate the power amplifier in the linear region, an input signal (e.g., s(t)) may be scaled down so the power amplifier 314 is not operated near the saturation point of the power amplifier 314. The first set of DMRS REs 510 are associated with a carrier and are transmitted on the first OFDM symbol 521 and are used to estimate the propagation channel, such as a multi-path channel. The other OFDM symbols (i.e., other than the first OFDM symbol 521) are transmitted in the non-linear region of the power amplifier. Additionally, the second set of DMRS REs 514 is transmitted on another symbol that does not include the first set of DMRS REs 514. For example, the second set of DMRS REs 514 is transmitted on the second OFDM symbol 522. The second set of DMRS REs 514 may be used to estimate a noise variance, a noise covariance matrix, or both.

Although the first set of DMRS REs 510 is shown on the first OFDM symbol 521 and the second set of DMRS REs is shown on the second OFDM symbol 522, in other implementations, the first set of DMRS REs 510, the second set of DMRS REs 514, or both, may be on different OFDM symbols. The location of the first set of DMRS REs 510 and the second set of DMRS REs 514 is known to the transmit device 315 and the receive device 305 and may be defined based on a standard. In some implementations, the receive device 305 may indicate the reference signal configuration, such as the slot format 500, to the transmit device 315. For example, if multiple reference signal configurations are available, the receive device 305 may indicate a particular reference signal configuration of the multiple reference signal configurations for the transmit device 315 to use.

In some implementations, the slot format 500 corresponds to a reference signal configuration in which the OFDM symbol that includes the first set of DMRS REs 510 is transmitted in the linear region of the power amplifier. Additionally, the second set of DMRS REs 514 may be transmitted in the non-linear region of the power amplifier 314. The first set of DMRS REs 510 may have a first constellation and the first set of PUSCH REs 512 may have a second constellation. The first constellation may be a QPSK constellation, which is unit modulus. The first constellation and the second constellation may be the same constellation or different constellations.

Additionally, the first set of PUSCH REs 512 are transmitted using the linear region of the power amplifier 314 and the second set of PUSCH REs 516 are transmitted in the non-linear region of the power amplifier 314. The second set of DMRS REs 514 may appear the same as the second set of PUSCH REs 516; however, the receive device 305 may know what was transmitted on the second set of DMRS REs (because the DMRS is a reference signal(s)) may not know what was transmitted on the second set of PUSCH REs 516. The second set of DMRS REs 514 may have the same constellation (e.g., a third constellation) as the second set of PUSCH REs 516. Additionally, or alternatively, the second constellation and the third constellation may be the same constellation or different constellations.

In some implementations, the first set of DMRS REs 510 received on the first OFDM symbol 521 can be written as:

$$Y_{k,1} = g_{lin} H_{k,1} S_{k,1} + N_{k,1},$$

where k is subcarrier index, 1 is OFDM symbol index, $Y_{k,l}$ is the received RE on the k-th subcarrier of the 1-th OFDM symbol, $H_{k,l}$ is the frequency domain channel response due to the propagation channel on the k-th subcarrier of the 1-th OFDM symbol, $S_{k,l}$ is the transmitted modulation symbol on the k-th subcarrier of the 1-th OFDM symbol, $N_{k,l}$ is the noise (e.g., thermal noise or interference) on the k-th subcarrier of the 1-th OFDM symbol, and $g_{lin}$ is the input power scaling used in the transmission of the OFDM symbol for the operation of the power amplifier 314 in the linear region. In some implementations, $S_{k,l}$ has unit modulus constellation, i.e., $|S_{k,l}| = 1$.

The second set of DMRS REs 514 and the second set of PUSCH REs 516 on the other OFDM symbols can be written as:

$$Y_{k,l} = \alpha \cdot g_{nonlin} H_{k,l} S_{k,l} + H_{k,l} D_{k,l} + N_{k,l},$$

where $\alpha$ is a first scaling factor (also referred to herein as a compression factor), $D_{k,l}$ is the distortion on the k-th subcarrier of the 1-th OFDM symbol, and $g_{nonlin}$ is the input power scaling used in the transmission of the OFDM symbol for the operation of the power amplifier 314 in the non-linear region. It is noted that $g_{nonlin}$ and $g_{lin}$ may be vendor specific. The modulation symbol for the second set of DMRS REs 514 use the same constellation as that for second set of PUSCH REs 516 (e.g. 16QAM).

The received PUSCH REs and the second set of DMRS RE's 516 can be re-written as (for l=2,3, . . . , n—where n is a positive integer greater than 1, such as 14):

$$Y_{k,l} = \beta(g_{lin} H_{k,l}) S_{k,l} + H_{k,l} D_{k,l} + N_{k,l},$$

where $\beta$ is a second scaling factor, such as the scaling factor 308, and is determined as:

$$\beta \triangleq \frac{\alpha \cdot g_{nonlin}}{g_{lin}}$$

The receive device 305 may estimate $g_{lin} H_{k,l}$ using the first set of DMRS REs 510. Hence, if the receive device 305 knows the second scaling factor $\beta$ (e.g., 308), the channel for the PUSCH REs $\beta(g_{lin} H_{k,l})$ can be found, which is used in the demodulation of PUSCH REs. In addition, once the second scaling factor $\beta$ is known, the second set of DMRS REs 514 can be used to estimate the noise variance arising from both noise and power amplifier distortion.

The distortion in the second set of DMRS REs 514 may tend to be heavily correlated within an OFDM symbol. Accordingly, directly estimating the channel $\beta(g_{lin} H_{k,l})$ from the second set of DMRS RE's 514 alone may not provide a satisfactory result. The first set of DMRS REs 510 may be used for the estimation of the scaled channel coefficients $g_{lin} H_{k,l}$ and the second set of DMRS REs 514 for the estimation of the noise variance, the noise covariance, or both.

The transmit device 315 may signal second scaling factor $\beta$ for the estimation of the channel coefficients $\beta(g_{lin} H_{k,l})$ on the PUSCH subcarriers. For example, the transmit device 315 may inform the second scaling factor $\beta$ to the receive device 315 in control information, such as a message that includes the control information (e.g., uplink control information (UCI) associated with the PUSCH or downlink control information (DCI) associated with the PDSCH). In some implementations, the scaling factor 308 may be one scaling factor $\beta$ common to multiple or all modulation and coding schemes (MCSs). Alternatively, the scaling factor 308 may include one scaling factor $\beta$ may be defined for each MCS—since different power amplifier operating points may be used for each MCS. For example, $g_{nonlin}$ for low MCS (e.g. QPSK) may be greater than $g_{nonlin}$ for high MCS (e.g. 16QAM).

In some implementations, the reference signal configuration 306, the scaling factor 308, or both may be transmitted from the transmit device 315 to the receive device 305. For example, the scaling factor 308 (or a set of scaling factors for multiple MCSs) can be signaled to the receive device 305 and the receive device 305 may store the information for the transmit device 315. The receive device 305 may store the different reference signal configuration 306, the scaling factor 308, or both from each of multiple transmit devices.

In some implementations, a message, such as an uplink grant, may indicate a MCS value. Based on the selected MSC, the transmit device 315 and the receive device 305 may determine which scaling factor (e.g., $\beta$) to use. Additionally, or alternatively, the scaling factor 308 (e.g., $\beta$) may be known or determined by the transmit device 315 and may be updated randomly or periodically. To illustrate, the scaling factor 308 may be updated based on a time of day, a number of operational hours or cycles (e.g., of the power amplifier 314), a device or ambient temperature, another characteristic or parameter that impacts operation of the power amplifier 314, or a combination thereof.

Referring to FIG. 3, during operation of the wireless communications system 300, the transmit device 315 may transmit a message 372 to the receive device 305. The message 372 may include control information 373, such as downlink control information (DCI) or uplink control information (UCI). The control information 373 may include an indication of the scaling factor 308.

The receive device 305 may send a grant 370, such as an uplink grant or a downlink grant, to the transmit device 315. The grant 370 may indicate a slot during which the transmit device 315 may transmit DMRSs. Additionally, or alternatively, the grant 370 may indicate a MCS, a reference signal configuration 306, or a combination thereof.

Based on the grant 370, the transmit device 315 transmits during the slot. For example, the transmit device 315 may transmit a first set of DMRS 374 with an input power scaling of $g_{lin}$ on a first OFDM symbol. The first set of DMRS 374 may include or correspond to the first set of DMRS REs 510. The first device 315 may also transmit the first resource 376, such as a first PUSCH or PDSCH, during the first OFDM symbol. The first resource 376 may include or correspond to the first set of PUSCH REs 512. The transmit device 315 may transmit a second set of DMRS 378 with the input power scaling of $g_{nonlin}$ on a second symbol of the remaining OFDM symbol in the slot (i.e., OFDM symbols without the first set of DMRS 374). The second set of DMRS 378 may include or correspond to the second set of DMRS REs 514. The transmit device 315 also may transmit a second resource 380, such as a second PUSCH or PDSCH, during the second OFDM symbol and one or more of the remaining OFDM symbol in the slot. The second resource 380 may include or correspond to the first set of PUSCH REs 512. The transmit device 315 may transmit the second resource 380 with the input power scaling of $g_{nonlin}$.

The receive device 305 may receive the first set of DMRS 374, the first resource 376, the second set of DMRS 378, and the second resource 380 during the slot. The receive device 305 performs one or more operations to recover the received resource, such as the first resource 376 and the second resource 380. For example, to recover the received resource, the receive device may perform one or more operations to demodulate and demap the received resource. To illustrate, the receive device 305 may uses the first set of DMRS 376 to estimate first channel coefficients, and a first noise variance, a first noise covariance matrix, or both for the OFDM symbols with the first set of DMRS 176. The first channel coefficients may include or correspond to the channel coefficient information 362. The first noise variance and the first noise covariance matrix may include or correspond to the noise information 360.

The receive device 305 may scale the first channel coefficients based on or by the scaling factor 308 (e.g., $\beta$) to obtain the estimates for second channel coefficients for the OFDM symbols without the first set of DMRS 374. The second channel coefficients may include or correspond to the channel coefficient information 362. The receive device 305 may use the second set of DMRS 378, the second channel coefficients, the scaling factor 308 (e.g., $\beta$), or a combination thereof, to estimate a second noise variance, a second noise covariance matrix, or both for the OFDM symbols without the first set of DMRS 374. The second noise variance and the second noise covariance matrix may include or correspond to the noise information 360.

On the OFDM symbols with the first set of DMRS 374, the receive device 305 may use the estimates of the first channel coefficients, the first noise variance, the first noise covariance matrix, or a combination thereof to perform recovery of the first resource 376. For example, on the OFDM symbols with the first set of DMRS 374, the receive device 305 may use the estimates of the first channel coefficients, the first noise variance, the first noise covariance matrix, or a combination thereof to perform demodulation and demapping of the first resource 376. On the OFDM symbols without the first set of DMRS 374, the receive device 305 may use the estimates of the second channel coefficients, the second noise variance, the second noise covariance matrix, or a combination thereof, to perform recovery of the second resource 380. For example, on the OFDM symbols without the first set of DMRS 374, the receive device 305 may use the estimates of the second channel coefficients, the second noise variance, the second noise covariance matrix, or a combination thereof, to perform demodulation and demapping of the second resource 380.

In some implementations, after recovery of the first resources 376, the receive device 305, such as the processor 352, may process the recovered first resources 376. Additionally, or alternatively, after recovery of the second resource 380, the receive device 305, such as the processor 352, may process the recovered second resources 380.

As described with reference to FIGS. 3-5, the present disclosure provides techniques for a reference signal configuration 306. The reference signal configuration 306 may be configured to enable the receive device 305 to account for a compression factor associated with transmit nonlinearity. For example, the receive device 305 may receive a scaling factor 308 for use as part of the reference signal configuration 306. Accordingly, the receive device 305 may receive a waveform having distortion and that appears noisy, and may perform one or more operations to properly classify the received modulated waveform, and demodulate and demap the waveform. Additionally, the transmit device 315 may efficiently utilize transmit power and conserve or extend a battery charge.

FIG. 6 is a flow diagram illustrating an example process 600 that supports a reference signal configuration to account for a compression factor associated with transmit nonlinearity according to some aspects. Operations of the process 600 may be performed by a UE, such as the UE 115 described above with reference to FIG. 1 or 2 or the UE 800 described with reference to FIG. 8, a base station, such the base station 105 of FIG. 1 or 2 or the base station 900 of FIG. 9, the transmit device 315, or the second device 305. For example, example operations (also referred to as "blocks") of the process 600 may enable a receive device to support a reference signal configuration to account for a compression factor associated with transmit nonlinearity.

In block 602, the receive device receives an indicator of a scaling factor from a transmit device including a power amplifier. The transmit device and the power amplifier may include or correspond to the transmit device 315 and the power amplifier 314, respectively. The scaling factor may include or correspond to the scaling factor 308. In some implementations, receiving the indicator may include receiving control information that includes the indicator. The indicator may include or correspond to the control information 373. The receive device may determine the scaling factor based on the indicator.

Scaling factors used in various deployments may have various attributes. For example, a scaling factor may be based on an input power scaling associated with a linear region operation of the power amplifier, an input power scaling associated with a non-linear region operation of the power amplifier, a compression factor, or a combination thereof. In some implementations, the scaling factor is based on a ratio. For example, the ratio may be based on the input power scaling associated with the linear region operation of the power amplifier, the input power scaling associated with the non-linear region operation of the power amplifier, and the compression factor observed at an output of the power amplifier due to power amplifier distortion (associated with the power ampliefier). In some implementations, the scaling factor is based on the input power scaling associated with a linear region operation of the power amplifier, the input power scaling associated with a non-linear region operation of the power amplifier, or a combination thereof. Scaling factors and associated indicators may adjust over time as communication scenarios change due to varied operational factors (e.g., air channel changes, device performance adjustments, wireless transmissions, etc.). Scaling factor data may be stored in memory for operations and can be updated during communication operations.

In block 604, the receive device receives shared channel REs from the transmit device during a slot. The shared channel REs may include or correspond to the first resource 376, the second resource 378, the first PUSCH RE 512, the second PUSCH RE 516, or a combination thereof. The slot may include or correspond to the slot 520. The receive device may receive the shared channel REs via the receiver 358, the antennas 234a-t, or the antennas 252a-r.

In block 606, the receive device recovers the received shared channel REs based on the scaling factor. In some implementations, to recover the received shared channel REs, the receive device may decode, demodulate, demap, or a combination thereof, the received shared channel REs. For example, the receive device may demodulate and demap the received shared channel REs using the antennas 234a-t, the modulator and demodulators 232a-t, the MIMO detector

236, the antennas 252*a-r*, the modulator and demodulators 254*a-r*, the MIMO detector 256, the receive processor 258, and the receive processor 238, the processor 352, or a combination thereof.

In some implementations, the receive device includes a base station, the transmit device includes a UE, the shared channel REs include one or more PUSCH REs, or a combination thereof. Alternatively, the receive device includes a UE, the transmit device includes a base station, the shared channel REs include one or more PDSCH REs, or a combination thereof.

In some implementations, the receive device determines the slot. Additionally, or alternatively, the receive device may transmit an indicator to the transmit device to indicate the slot. For example, the receive device may transmit a message, such as the grant message 370, that includes the indicator.

In some implementations, the receive device receives a first set of DMRS REs associated with the linear region operation during a first symbol of the slot or a first symbol of the shared channel. The first set of DMRS REs may include or correspond to the first DMRS 374 or the first DMRS REs 510. The first symbol may include or correspond to the symbol 521, as an illustrative, non-limiting example. Additionally, or alternatively, the receive device receives a second set of DMRS REs associated with the non-linear region operation from the transmit device during a second symbol of the slot or a second symbol of the shared channel. The second set of DMRS REs may include or correspond to the second DMRS 378 or the second DMRS REs 514. The second symbol may include or correspond to the symbol 522, as an illustrative, non-limiting example.

In some implementations, the shared channel REs include a first set of shared channel REs received during the first symbol of the slot or the first symbol of the shared channel. The first set of shared channel REs include or correspond to the first resource 376 or the first PUSCH RE 512. The first set of DMRS REs and the first set of shared channel REs may be transmitted by the transmit device based on the input power scaling associated with the linear region operation of the power amplifier. Additionally, or alternatively, the shared channel REs include a second set of shared channel REs receiving during the second symbol of the slot or the second symbol of the shared channel. The second set of shared channel REs include or correspond to the second resource 380 or the second PUSCH RE 516. The second set of DMRS REs and the second set of shared channel REs may be transmitted by the transmit device based on the input power scaling associated with the non-linear region operation of the power amplifier.

In some implementations, the receive device identifies the first set of DMRS REs, Based on the first set of DMRS REs, the receive device may estimate a first set of channel coefficients for the first set of shared channel REs. The first set of channel coefficients may include or correspond to the channel coefficient information 362. Additionally, or alternatively, based on the first set of DMRS REs, the receive device may estimate a first noise variance, a first noise covariance matrix, or a combination thereof for the first set of shared channel REs. The first noise variance, the noise covariance matrix may include or correspond to the noise information 360. The receive device may also estimate a second set of channel coefficients for the second set of shared channel REs. The second set of channel coefficients may include or correspond to the channel coefficient information 362. Additionally, or alternatively, the receive device may scale the first set of channel coefficients base on the scaling factor to obtain the second set of channel coefficients. Based on the second set of channel coefficients, the second set of DMRS REs, the scaling factor, or a combination thereof, the receive device may estimate a second noise variance, a second noise covariance matrix, or a combination thereof for the second set of shared channel REs. The second noise variance, the second covariance matrix may include or correspond to the noise information 360.

In some implementations, to recover the received shared channel REs, the receive device demodulates and demaps the first set of shared channel REs based on the first set of channel coefficients, the first noise variance, the first noise covariance matrix, or a combination thereof. Additionally, or alternatively, to demodulate and demap the received shared channel REs, the receive device demodulates and demaps the second set of shared channel REs based on the second set of channel coefficients, the second noise variance, the second noise covariance matrix, or a combination thereof. The receive device may demodulate and demap the first set of shared channel REs, the second set of shared channel REs, or both using the antennas 234*a-t*, the modulator and demodulators 232*a-t*, the MIMO detector 236, the antennas 252*a-r*, the modulator and demodulators 254*a-r*, the MIMO detector 256, the receive processor 258, and the receive processor 238, the processor 352, or a combination thereof.

In some implementations, the receive device determines one or more scaling factors associated with the transmit device. The one or more scaling factors may include the scaling factor. The one or more scaling factors also may include one scaling factor that is common to multiple MCSs. The multiple MCSs may include or correspond to the reference signal configuration 306. Alternatively, the one or more scaling factors may include multiple scaling factors, and each scaling factor of the multiple scaling factors corresponds to a different MCS. Each of the different MCSs may include or correspond to the reference signal configuration 306.

FIG. 7 is a flow diagram illustrating an example process 700 that supports a reference signal configuration to account for a compression factor associated with transmit nonlinearity according to some aspects. Operations of the process 700 may be performed by a UE, such as the UE 115 described above with reference to FIG. 1 or 2 or the UE 800 described with reference to FIG. 8, a base station, such as the base station 105 of FIG. 1 or 2 or the base station 900 of FIG. 9, the transmit device 315, or the second device 305. For example, example operations (also referred to as "blocks") of the process 700 may enable a transmit device to support a reference signal configuration to account for a compression factor associated with transmit nonlinearity.

In block 702, the transmit device transmits an indicator of a scaling factor to a receive device. The scaling factor may include or correspond to the scaling factor 308. The receive device may include or correspond to the receive device 305. In some implementations, transmitting the indicator includes transmitting control information that includes the indicator. The indicator may include or correspond to the control information 373.

Scaling factor indications and/or scaling factors may be based on a number of considerations or factors. For example, in some instances, a scaling factor can be based on an input power scaling associated with a linear region operation of a power amplifier, an input power scaling associated with a non-linear region operation of the power amplifier, a compression factor, or a combination thereof. The power amplifier may include or correspond to the power amplifier 314. In some implementations, the scaling factor is based on a ratio. For example, the ratio may be based on the input power scaling associated with the linear region operation of the power amplifier, the input power scaling associated with the non-linear region operation of the power amplifier, and the compression factor observed at the output of the power amplifier due to power amplifier distortion.

In block 704, the transmit device configures shared channel REs based on the scaling factor. The shared channel REs may include or correspond to the first resource 376, the second resource 378, the first PUSCH RE 512, the second PUSCH RE 516, or a combination thereof. To configure the shared channel REs, the transmit device may encode, modulate, map, or a combination thereof, the shared channel REs based on the scaling factor. In some implementations, the transmit device may modulate or map the shared channel REs using the modulator and demodulators 254a-r, the transmit processor 264, the modulator and demodulators 232a-t, the transmit processor 220, or a combination thereof.

In block 706, the transmit device transmits the configured shared channel REs to the receive device. For example, the transmit device may transmit the modulated and mapped shared channel REs using the transmitter 316, transmitter 356, the antennas 234a-t, the TX MIMO processor 266, the antennas 252a-r, the TX MIMO processor 230, processor 302, transmitter 316, or a combination thereof.

In some implementations, the receive device includes a base station, the transmit device includes a UE, the shared channel REs include one or more PUSCH REs, or a combination thereof. Alternatively, the receive device includes a UE, the transmit device includes a base station, the shared channel REs include one or more PDSCH REs, or a combination thereof.

In some implementations, the transmit device receives an indication of a slot from the receive device. For example, the indication may be received in a message, such as the grant message 370. The slot may include or correspond to the slot 520. The configured shared channel REs may be transmitted to the receive device during the slot. For example, in some implementations, the modulated and mapped shared channel REs are transmitted to the receive device during the slot.

In some implementations, the transmit device configures the power amplifier based on the input power scaling associated with the linear region operation, and transmits a first set of DMRS REs based on the linear region operation during a first symbol of the slot or a first symbol of the shared channel. The first set of DMRS REs may include or correspond to the first DMRS 374 or the first DMRS REs 510. The first symbol may include or correspond to the symbol 521, as an illustrative, non-limiting example. Additionally, or alternatively, the transmit device configures the power amplifier based on the input power scaling associated with the non-linear region operation, and transmits a second set of DMRS REs based on the non-linear region operation from the transmit device during a second symbol of the slot or a second symbol of the shared channel. The second set of DMRS REs may include or correspond to the second DMRS 378 or the second DMRS REs 514. The second symbol may include or correspond to the symbol 522, as an illustrative, non-limiting example.

In some implementations, to transmit the shared channel REs, the transmit device transmits a first set of shared channel REs based on the linear region operation during the first symbol of the slot or the first symbol of the shared channel. The first set of shared channel REs include or correspond to the first resource 376 or the first PUSCH RE 512. Additionally, or alternatively, the transmit device transmits a second set of shared channel REs based on the non-linear region operation during the second symbol of the slot or the second symbol of the shared channel. The second set of shared channel REs include or correspond to the second resource 380 or the second PUSCH RE 516. The second symbol may include or correspond to the symbol 522, as an illustrative, non-limiting example.

In some implementations, the transmit device determines one or more scaling factors, the one or more scaling factors including the scaling factor. The one or more scaling factors may include one scaling factor that is common to multiple MCSs. The multiple MCSs may include or correspond to the reference signal configuration 306. Alternatively, the one or more scaling factors may include multiple scaling factors, and each scaling factor of the multiple scaling factors corresponds to a different MCS. Each of the different MCSs may include or correspond to the reference signal configuration 306.

As described with reference to FIGS. 6 and 7, the present disclosure provides techniques for use of a reference signal configuration. The reference signal configuration may be configured to enable the receive device to account for a compression factor associated with transmit nonlinearity. For example, the receive device may receive a scaling factor for use as part of the reference signal configuration. Accordingly, the receive device may receive a waveform having distortion and that appears noisy, and may perform one or more operations to properly classify the received modulated waveform, and demodulate and demap the waveform. Additionally, the transmit device may efficiently utilize transmit power and conserve or extend a battery charge.

Figure 8:
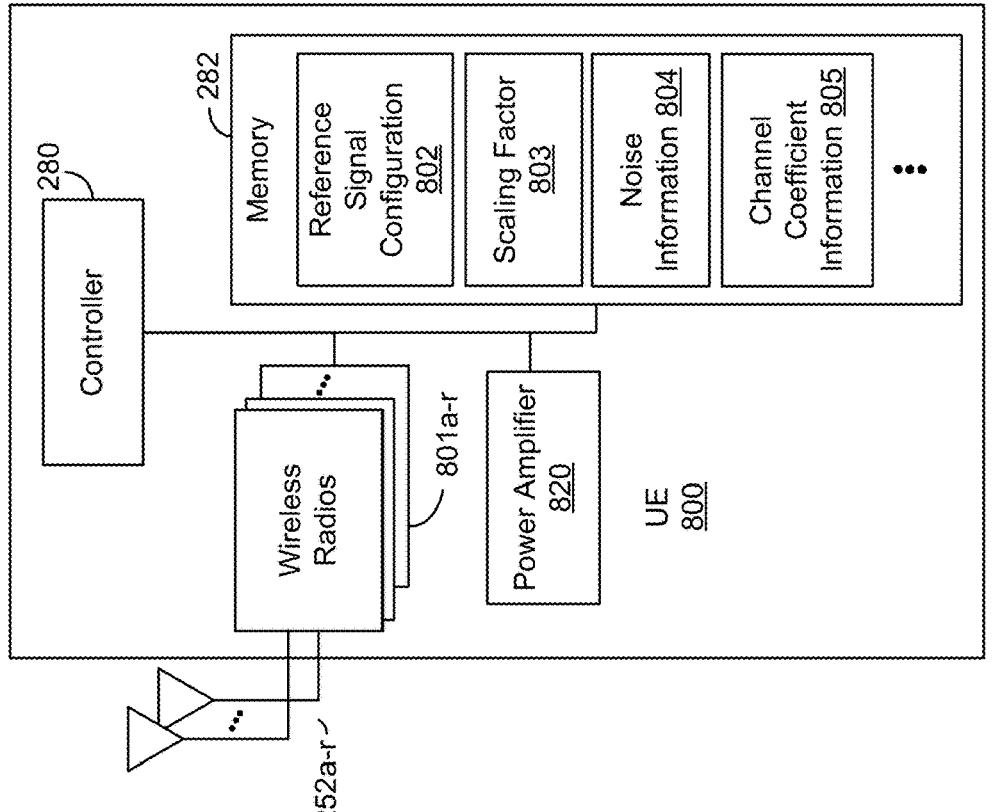
FIG. 8 is a block diagram of an example UE that supports wireless communication according to some aspects.

FIG. 8 is a block diagram of an example UE 800 that supports a reference signal configuration to account for a compression factor associated with transmit nonlinearity according to some aspects. The UE 800 may be configured to perform operations, including the blocks of a process described with reference to FIGS. 6 and 7, to use a reference signal configuration. In some implementations, the UE 800 includes the structure, hardware, and components shown and described with reference to the UE 115 of FIG. 2, the transmit device 315, or the receive device 305. For example, the UE 800 includes the controller 280, which operates to execute logic or computer instructions stored in the memory 282, as well as controlling the components of the UE 800 that provide the features and functionality of the UE 800. The UE 800, under control of the controller 280, transmits and receives signals via the wireless radios 801a-r and the antennas 252a-r. The wireless radios 801a-r include various components and hardware, as illustrated in FIG. 2 for the UE 115, including the modulator and demodulators 254a-r, the MIMO detector 256, the receive processor 258, the transmit processor 264, and the TX MIMO processor 266. Additionally, the UE 800 includes a power amplifier 820. The power amplifier may include or correspond to the power amplifier 314.

As shown, the memory 282 may include a reference signal configuration 802, a scaling factor 803, noise information 804, and channel coefficient information 805. The reference signal configuration 802, the scaling factor 803, the noise information 804, and the channel coefficient information 805 may include or correspond to the reference signal configuration 306, the scaling factor 308, the noise information 360, and the channel coefficient information, respectively. The UE 800 may receive signals from or transmit signals to one or more devices, such as the base station 105 of FIG. 1 or 2, the transmit device 315, the receive device 305, or a base station as illustrated in FIG. 9.

Figure 9:
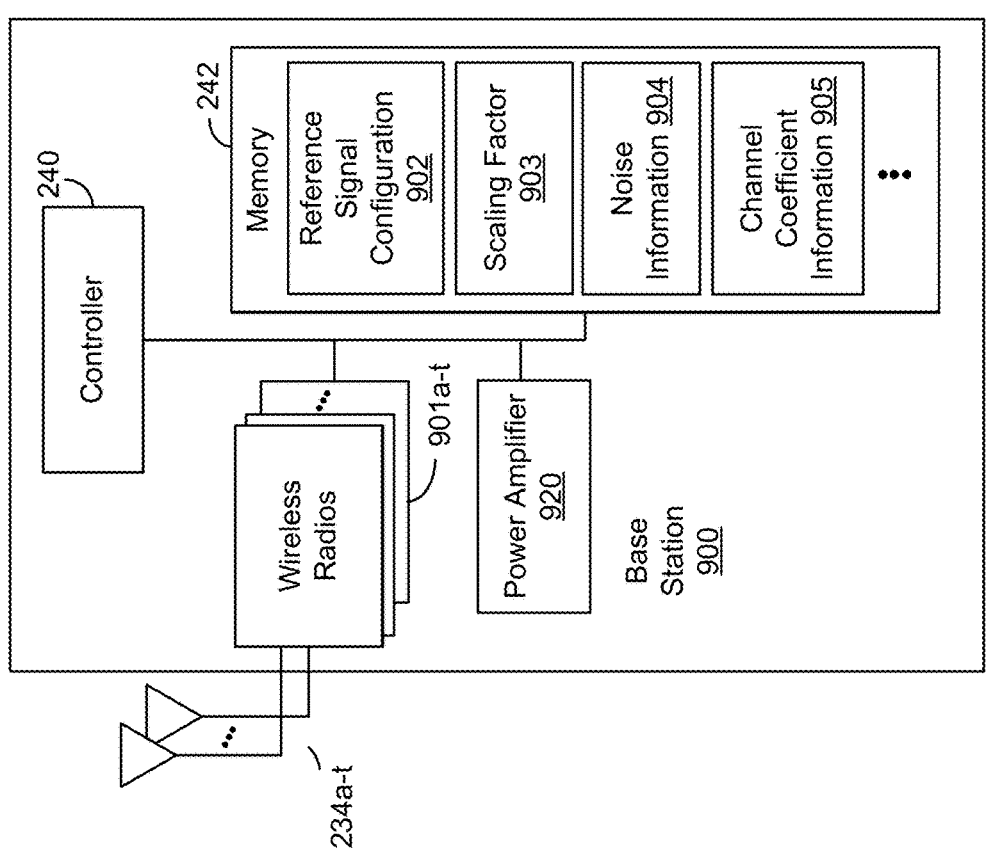
FIG. 9 is a block diagram of an example base station that supports wireless communication according to some aspects.

FIG. 9 is a block diagram of an example base station 900 that supports a reference signal configuration to account for a compression factor associated with transmit nonlinearity according to some aspects. The base station 900 may be configured to perform operations, including the blocks of the process 900 described with reference to FIGS. 6 and 7, to use a reference signal configuration. In some implementations, the base station 900 includes the structure, hardware, and components shown and described with reference to the base station 105 of FIG. 2, the transmit device 315, or the receive device 305. For example, the base station 900 may include the controller 240, which operates to execute logic or computer instructions stored in the memory 242, as well as controlling the components of the base station 900 that provide the features and functionality of the base station 900. The base station 900, under control of the controller 240, transmits and receives signals via wireless radios 901a-t and the antennas 234a-t. The wireless radios 901a-t include various components and hardware, as illustrated in FIG. 2 for the base station 105, including the modulator and demodulators 232a-t, the transmit processor 220, the TX MIMO processor 230, the MIMO detector 236, and the receive processor 238. Additionally, the base station 900 includes a power amplifier 920. The power amplifier may include or correspond to the power amplifier 314.

As shown, the memory 242 may include a reference signal configuration 902, a scaling factor 903, noise information 904, and channel coefficient information 905. The reference signal configuration 902, the scaling factor 903, the noise information 904, and the channel coefficient information 905 may include or correspond to the reference signal configuration 306, the scaling factor 308, the noise information 360, and the channel coefficient information, respectively. The base station 900 may receive signals from or transmit signals to one or more devices, such as the UE 115 of FIG. 1 or 2, the transmit device 315, the receive device 305, or the UE 800.

It is noted that one or more blocks (or operations) described with reference to FIG. 6 or 7 may be combined with one or more blocks (or operations) described with reference to another of the figures. For example, one or more blocks (or operations) of FIG. 6 may be combined with one or more blocks (or operations) of FIG. 7. As another example, one or more blocks associated with FIG. 6 or 7 may be combined with one or more blocks (or operations) associated with FIGS. 1-5. Additionally, or alternatively, one or more operations described above with reference to FIGS. 1-5 may be combined with one or more operations described with reference to FIG. 8 or 9.

In some aspects, techniques for supporting a reference signal configuration to account for a compression factor due to transmit nonlinearity may include additional aspects, such as any single aspect or any combination of aspects described below or in connection with one or more other processes or devices described elsewhere herein. In a first aspect, techniques for supporting reference signal configuration may include receiving an indicator of a scaling factor from a transmit device including a power amplifier. The scaling factor is based on an input power scaling associated with a linear region operation of the power amplifier, an input power scaling associated with a non-linear region operation of the power amplifier, a compression factor, or a combination thereof. The techniques further include receiving shared channel REs from the transmit device during a slot, and recovering the received shared channel REs based on the scaling factor. In some examples, the techniques in the first aspect may be implemented in a method or process. In some other examples, the techniques of the first aspect may be implemented in a wireless communication device such as a receive device, which may include a UE or a component of a UE, or a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a second aspect, in combination with the first aspect, to recover the received shared channel REs, the the techniques further include demodulating and demapping the received shared channel REs.

In a third aspect, in combination with the first aspect or the second aspect, the indicator is received at a receive device that includes one of a UE or a base station, the transmit device includes the other of the UE or the base station, the shared channel REs include one or more PDSCH REs, or a combination thereof.

In a fourth aspect, in combination with one or more of the first aspect through the third aspect, the scaling factor is based on a ratio, the ratio is based on the input power scaling associated with the linear region operation of the power amplifier, the input power scaling associated with the non-linear region operation of the power amplifier, and the compression factor observed at the output of the power amplifier due to power amplifier distortion.

In a fifth aspect, in combination with one or more of the first aspect through the fourth aspect, to receive the indicator, to receiving control information that includes the indicator.

In a sixth aspect, in combination with the fifth aspect, to receive the indicator, the techniques further include, determining the scaling factor based on the indicator.

In a seventh aspect, in combination with one or more of the first aspect through the sixth aspect, the techniques further include determining the slot.

In an eighth aspect, in combination with the seventh aspect, the techniques further include initiating transmission of an indicator to the transmit device to indicate the slot.

In a ninth aspect, in combination with one or more of the first aspect through the eighth aspect, the techniques further include receiving a first set of DMRS REs associated with the linear region operation during a first symbol of the shared channel.

In a tenth aspect, in combination with the ninth aspect, the techniques further include receiving a second set of DMRS REs associated with the non-linear region operation from the transmit device during a second symbol of the shared channel.

In an eleventh aspect, in combination with the tenth aspect, the shared channel REs include a first set of shared channel REs received during the first symbol of the shared channel and a second set of shared channel REs receiving during the second symbol of the shared channel.

In a twelfth aspect, in combination with the eleventh aspect, the first set of DMRS REs and the first set of shared channel REs are transmitted by the transmit device based on the input power scaling associated with the linear region operation of the power amplifier.

In a thirteenth aspect, in combination with the twelfth aspect, the second set of DMRS REs and the second set of shared channel REs are transmitted by the transmit device based on the input power scaling associated with the non-linear region operation of the power amplifier.

In a fourteenth aspect, in combination with one or more of the eleventh through thirteenth aspects, the techniques further include identifying the first set of DMRS REs.

In a fifteenth aspect, in combination with the fourteenth aspect, the techniques further include, based on the first set of DMRS REs, estimating a first set of channel coefficients for the first set of shared channel REs.

In a sixteenth aspect, in combination with the fifteenth aspect, the techniques further include, based on the first set of DMRS REs, estimating a first noise variance, a first noise covariance matrix, or a combination thereof for the first set of shared channel REs.

In a seventeenth aspect, in combination with one or more of the eleventh through sixteenth aspect, the techniques further include estimating a second set of channel coefficients for the second set of shared channel REs.

In an eighteenth aspect, in combination with the seventeenth aspect, to estimate the second set of channel coefficients, the techniques further include scaling the first set of channel coefficients base on the scaling factor. For example, the techniques may include scaling the first set of channel coefficients base on the scaling factor to obtain the second set of channel coefficients.

In a nineteenth aspect, in combination with the eighteenth aspect, the techniques further include, based on the second set of channel coefficients, the second set of DMRS REs, the scaling factor, or a combination thereof, estimating a second noise variance, a second noise covariance matrix, or a combination thereof for the second set of shared channel REs.

In a twentieth aspect, in combination with the nineteenth aspect, to recover the received shared channel REs, the techniques further include demodulating and demapping the first set of shared channel REs based on the first set of channel coefficients, the first noise variance, the first noise covariance matrix, or a combination thereof.

In a twenty-first aspect, in combination with the twentieth aspect, to recover the received shared channel REs, the techniques further include demodulating and demapping the second set of shared channel REs based on the second set of channel coefficients, the second noise variance, the second noise covariance matrix, or a combination thereof.

In a twenty-second aspect, in combination with one or more of the first aspect through the twenty-first aspect, the techniques further include determining one or more scaling factors associated with the transmit device.

In a twenty-third aspect, in combination with the twenty-second aspect, the one or more scaling factors including the scaling factor.

In a twenty-fourth aspect, in combination with one or more of the twenty-second aspect through the twenty-third aspect, the one or more scaling factors include one scaling factor that is common to multiple MCSs.

In a twenty-fifth aspect, in combination with one or more of the twenty-second aspect through the twenty-third aspect, the one or more scaling factors include multiple scaling factors, and each scaling factor of the multiple scaling factors corresponds to a different MCS.

In some aspects, techniques for supporting a reference signal configuration to account for a compression factor due to transmit nonlinearity may include additional aspects, such as any single aspect or any combination of aspects described below or in connection with one or more other processes or devices described elsewhere herein. In a twenty-sixth aspect, techniques for supporting reference signal configuration may include initiating transmission of an indicator of a scaling factor to a receive device. The scaling factor is based on an input power scaling associated with a linear region operation of a power amplifier, an input power scaling associated with a non-linear region operation of the power amplifier, a compression factor, or a combination thereof. The techniques of the twenty-sixth aspect further include configuring shared channel REs based on the input power scaling associated with a linear region operation of a power amplifier, the input power scaling associated with a non-linear region operation of a power amplifier, or a combination thereof, and initiating transmission of the configured shared channel REs to the receive device during a slot. In some examples, the techniques in the twenty-sixth aspect may be implemented in a method or process. In some other examples, the techniques of the twenty-sixth aspect may be implemented in a wireless communication device, such as a transmit device, which may include as a UE or a component of a UE, or a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a twenty-seventh aspect, in combination with the twenty-sixth aspect, to configure the shared channel REs, the techniques further include modulating and mapping the shared channel resource REs based on the input power scaling.

In a twenty-eighth aspect, in combination with the twenty-sixth aspect, the receive device includes one of a UE or a base station, the indicator is transmitted by a transmit device that includes the other of the UE or the base station, the shared channel REs include one or more PDSCH REs, or a combination thereof.

In a twenty-ninth aspect, in combination with one or more of the twenty-sixth aspect through the twenty-eighth aspect, the scaling factor is based on a ratio.

In a thirtieth aspect, in combination with the twenty-ninth aspect, the ratio is based on the input power scaling associated with the linear region operation of the power amplifier, the input power scaling associated with the non-linear region operation of the power amplifier, and the compression factor observed at the output of the power amplifier due to power amplifier distortion.

In a thirty-first aspect, in combination with one or more of the twenty-sixth aspect through the thirtieth aspect, to transmit the indicator, the techniques further include initiating transmission of control information that includes the indicator.

In a thirty-second aspect, in combination with one or more of the twenty-sixth aspect through the thirty-first aspect, the techniques further include receiving an indication of the slot from the receive device.

In a thirty-third aspect, in combination with the thirty-second aspect, the configured shared channel REs are transmitted to the receive device during the slot.

In a thirty-fourth aspect, in combination with one or more of the twenty-sixth aspect through the thirty-third aspects, the techniques further include configuring the power amplifier based on the input power scaling associated with the linear region operation.

In a thirty-fifth aspect, in combination with the thirty-fourth aspect, the techniques further include initiating transmission of a first set of DMRS REs based on the linear region operation during a first symbol of the shared channel.

In a thirty-sixth aspect, in combination with the thirty-fifth aspect, the techniques further include configuring the power amplifier based on the input power scaling associated with the non-linear region operation.

In a thirty-seventh aspect, in combination with the thirty-fifth aspect, the techniques further include initiating transmission of a second set of DMRS REs based on the non-linear region operation from the transmit device during a second symbol of the shared channel.

In a thirty-eighth aspect, in combination with the thirty-seventh aspect, to transmit the shared channel REs, the techniques further include initiating transmission of a first set of shared channel REs based on the linear region operation during the first symbol of the shared channel.

In a thirty-ninth aspect, in combination with the thirty-eighth aspect, to transmit the shared channel REs, the techniques further include initiating transmission of a second set of shared channel REs based on the non-linear region operation during the second symbol of the shared channel.

In a fortieth aspect, in combination with one or more of the twenty-sixth aspect through the thirty-ninth aspect, the techniques further include determining one or more scaling factors, the one or more scaling factors including the scaling factor.

In a forty-first aspect, in combination with the fortieth aspect, the one or more scaling factors include one scaling factor that is common to multiple MCSs.

In a forty-second aspect, in combination with the fortieth aspect, the one or more scaling factors include multiple scaling factors, and each scaling factor of the multiple scaling factors corresponds to a different MCS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a receive device, the method comprising:
   receiving a scaling factor from a transmit device that includes a power amplifier, the scaling factor generated in accordance with a first input power scaling associated with a linear region operation of the power amplifier, a second input power scaling associated with a non-linear region operation of the power amplifier, and a compression factor;
   receiving shared channel resource elements (REs) from the transmit device during a slot; and
   recovering the received shared channel REs in accordance with the scaling factor, wherein recovering the received shared channel REs includes:
      obtaining, based at least in part on the scaling factor, channel coefficients and noise variance information associated with orthogonal frequency division multiplex (OFDM) symbols communicated via a shared channel between the transmit device and the receive device.

2. The method of claim 1, wherein recovering the received shared channel REs includes demodulating and demapping the received shared channel REs.

3. The method of claim 1, wherein:
   the receive device includes one of a user equipment (UE) or a base station;
   the transmit device includes the other of the UE or the base station;
   the shared channel REs include one or more physical downlink shared channel (PDSCH) REs; or
   a combination thereof.

4. The method of claim 1, wherein the scaling factor comprises a ratio of the first input power scaling associated with the linear region operation of the power amplifier and applied to an OFDM symbol of the OFDM symbols, the second input power scaling associated with the non-linear region operation of the power amplifier and applied to another OFDM symbol of the OFDM symbols, and the compression factor observed at an output of the power amplifier due to power amplifier distortion, wherein the OFDM symbol and the another OFDM symbol are different ones of the OFDM symbols.

5. The method of claim 1, wherein receiving the scaling factor includes:

receiving control information that includes the scaling factor; and storing the scaling factor in a memory of the receive device.

6. The method of claim 1, further comprising:

receiving a first set of demodulation reference signal (DMRS) REs associated with the linear region operation during a first OFDM symbol of the OFDM symbols; and receiving a second set of DMRS REs associated with the non-linear region operation from the transmit device during a second OFDM symbol of the OFDM symbols.

7. The method of claim 6, wherein the shared channel REs include a first set of shared channel REs received during the first OFDM symbol and a second set of shared channel REs receiving during the second OFDM symbol.

8. The method of claim 7, wherein:

the first set of DMRS REs and the first set of shared channel REs are transmitted by the transmit device having the first input power scaling associated with the linear region operation of the power amplifier applied thereto; and the second set of DMRS REs and the second set of shared channel REs are transmitted by the transmit device having the second input power scaling associated with the non-linear region operation of the power amplifier applied thereto.

9. The method of claim 7, further comprising:

identifying the first set of DMRS REs; and based on the first set of DMRS REs, estimating a first set of channel coefficients for the first set of shared channel REs based at least in part on the scaling factor; and estimating a first noise variance, a first noise covariance matrix, or a combination thereof for the first set of shared channel REs based at least in part on the scaling factor.

10. The method of any one of claim 9, further comprising estimating a second set of channel coefficients for the second set of shared channel REs based at least in part on the scaling factor.

11. The method of claim 10, wherein estimating the second set of channel coefficients includes scaling the first set of channel coefficients in accordance with the scaling factor, and, further comprising:

estimating a second noise variance, a second noise covariance matrix, or a combination thereof for the second set of shared channel REs in accordance with the second set of channel coefficients, the second set of DMRS REs, the scaling factor, or a combination thereof.

12. The method of claim 11, wherein recovering the received shared channel REs includes:

demodulating and demapping the first set of shared channel REs in accordance with the first set of channel coefficients, a first noise variance, a first noise covariance matrix, or a combination thereof;

demodulating and demapping the second set of shared channel REs in accordance with the second set of channel coefficients, the second noise variance, the second noise covariance matrix, or a combination thereof; or a combination thereof.

13. The method of claim 1, further comprising:

receiving one or more scaling factors associated with the transmit device, the one or more scaling factors including the scaling factor; and wherein the one or more scaling factors include one scaling factor that is common to multiple modulation and coding schemes (MCSs), or wherein the one or more scaling factors include multiple scaling factors, and each scaling factor of the multiple scaling factors corresponds to a different modulation and coding scheme (MCS).

14. A method of wireless communication performed by a transmit device, the method comprising:

transmitting a scaling factor to a receive device, the scaling factor generated in accordance with a first input power scaling associated with a linear region operation of a power amplifier, a second input power scaling associated with a non-linear region operation of the power amplifier, and a compression factor;

configuring shared channel resource elements (REs) in accordance with the first input power scaling associated with the linear region operation of a power amplifier and the second input power scaling associated with the non-linear region operation of a power amplifier, wherein configuring the shared channel REs includes:

applying the first input power scaling associated with the linear region operation of the power amplifier to an orthogonal frequency division multiplex (OFDM) symbol associated with a first set of REs of the shared channel REs; and applying the second input power scaling associated with the non-linear region operation of the power amplifier to another OFDM symbol associated with a second set of RE of the shared channel REs, wherein the OFDM symbol and the another OFDM symbol are different OFDM symbols; and transmitting the configured shared channel REs to the receive device during a slot.

15. The method of claim 14, wherein configuring the shared channel REs includes modulating and mapping the shared channel REs in accordance with the first input power scaling associated with a linear region operation of a power amplifier and the second input power scaling associated with a non-linear region operation of a power amplifier.

16. The method of claim 14, wherein:

the receive device includes one of a user equipment (UE) or a base station;

the transmit device includes the other of the UE or the base station;

the shared channel REs include one or more physical downlink shared channel (PDSCH) REs; or a combination thereof.

17. The method of claim 14, wherein the scaling factor comprises a ratio of the first input power scaling associated with the linear region operation of the power amplifier, the second input power scaling associated with the non-linear region operation of the power amplifier, and the compression factor observed at an output of the power amplifier due to power amplifier distortion.

18. The method of claim 14, wherein transmitting the scaling factor includes transmitting control information that includes the scaling factor.

19. The method of claim 14, further comprising:
configuring the power amplifier in accordance with the first input power scaling associated with the linear region operation;
transmitting a first set of demodulation reference signal (DMRS) REs in accordance with the linear region operation during the OFDM symbol;
configuring the power amplifier in accordance with the second input power scaling associated with the non-linear region operation; and
transmitting a second set of DMRS REs in accordance with the non-linear region operation from the transmit device during the another OFDM symbol.

20. The method of claim 19, wherein transmitting the shared channel REs includes:
transmitting the first set of REs in accordance with the linear region operation during the OFDM symbol; and
transmitting the second set of REs in accordance with the non-linear region operation during the another OFDM symbol.

21. The method of claim 14, further comprising:
transmitting one or more scaling factors, the one or more scaling factors including the scaling factor; and
wherein the one or more scaling factors include one scaling factor that is common to multiple modulation and coding schemes (MCSs), or
wherein the one or more scaling factors include multiple scaling factors, and each scaling factor of the multiple scaling factors corresponds to a different MCS.

22. A receive device comprising:
at least one processor; and
a memory coupled with the at least one processor and storing processor-readable code that, when executed by the at least one processor, is configured to:
receive a scaling factor from a transmit device that includes a power amplifier, the scaling factor generated in accordance with a first input power scaling associated with a linear region operation of the power amplifier, a second input power scaling associated with a non-linear region operation of the power amplifier, and a compression factor;
receive shared channel resource elements (REs) from the transmit device during a slot; and
recover the received shared channel REs in accordance with the scaling factor, wherein recovering the received shared channel REs includes obtaining, based at least in part on the scaling factor, channel coefficients and noise variance information associated with orthogonal frequency division multiplex (OFDM) symbols communicated via a shared channel between the transmit device and the receive device.

23. The receive device of claim 22, wherein:
the receive device includes a base station or a user equipment (UE), and the transmit device includes the other of the base station or the UE.

24. The receive device of claim 22, wherein the scaling factor comprises a ratio of the first input power scaling associated with the linear region operation of the power amplifier and applied to an OFDM symbol of the OFDM symbols, the second input power scaling associated with the non-linear region operation of the power amplifier and applied to another OFDM symbol of the OFDM symbols, and the compression factor observed at an output of the power amplifier due to power amplifier distortion, wherein the OFDM symbol and the another OFDM symbol are different ones of the OFDM symbols.

25. The receive device of claim 22, wherein to receive the scaling factor, the processor-readable code that, when executed by the at least one processor, is configured to:
receive control information that includes the scaling factor; and
store the scaling factor in a memory of the receive device.

26. The receive device of claim 22, wherein the processor-readable code that, when executed by the at least one processor, is configured to:
receive a first set of demodulation reference signal (DMRS) REs associated with the linear region operation during a first OFDM symbol of the OFDM symbols; and
receive a second set of DMRS REs associated with the non-linear region operation from the transmit device during a second OFDM symbol of the OFDM symbols,
wherein the shared channel REs include a first set of shared channel REs received during the first OFDM symbol and a second set of shared channel REs receiving during the second OFDM symbol.

27. A transmit device comprising:
at least one processor; and
a memory coupled with the at least one processor and storing processor-readable code that, when executed by the at least one processor, is configured to:
initiate transmission of a scaling factor to a receive device, the scaling factor generated in accordance with a first input power scaling associated with a linear region operation of a power amplifier, a second input power scaling associated with a non-linear region operation of the power amplifier, and a compression factor;
configure shared channel resource elements (REs) in accordance with the first input power scaling associated with a linear region operation of a power amplifier and the second input power scaling associated with the non-linear region operation of a power amplifier, wherein configuring the shared channel REs includes:
applying the first input power scaling associated with the linear region operation of the power amplifier to an orthogonal frequency division multiplex (OFDM) symbol associated with a first set of REs of the shared channel REs; and
applying the second input power scaling associated with the non-linear region operation of the power amplifier to another OFDM symbol associated with a second set of RE of the shared channel REs, wherein the OFDM symbol and the another OFDM symbol are different OFDM symbols; and
initiate transmission of the configured shared channel REs to the receive device.

28. The receive device of claim 27, wherein:
the receive device includes a base station or a user equipment (UE), and the transmit device includes the other of the base station or the UE, and
the shared channel REs include one or more physical uplink shared channel (PUSCH) REs.

29. The receive device of claim 27, wherein:
the scaling factor comprises a ratio of the first input power scaling associated with the linear region operation of the power amplifier, the second input power scaling associated with the non-linear region operation of the power amplifier, and the compression factor observed at an output of the power amplifier due to power amplifier distortion; and to initiate of transmission of the scaling factor, the processor-readable code that, when executed by the at least one processor, is configured to initiate transmission of control information that includes the scaling factor.

30. The receive device of claim 27, wherein the processor-readable code that, when executed by the at least one processor, is configured to:

configure the power amplifier in accordance with the first input power scaling associated with the linear region operation;

initiate transmission of a first set of demodulation reference signal (DMRS) REs in accordance with the linear region operation during the OFDM symbol;

configure the power amplifier in accordance with the second input power scaling associated with the non-linear region operation; and initiate transmission of a second set of DMRS REs in accordance with the non-linear region operation from the transmit device during the another OFDM symbol.

\* \* \* \* \*